(12) United States Patent
Pudvay

(10) Patent No.: US 8,808,547 B2
(45) Date of Patent: Aug. 19, 2014

(54) APPARATUS AND PROCESSES FOR REMOVING BORON FROM LIQUIDS

(75) Inventor: Michael L. Pudvay, Royal Oak, MI (US)

(73) Assignee: Infilco Degremont, Inc., Richmond, VA (US)

( * ) Notice: Subject to any disclaimer, the term of this patent is extended or adjusted under 35 U.S.C. 154(b) by 1181 days.

(21) Appl. No.: 12/512,091

(22) Filed: Jul. 30, 2009

(65) Prior Publication Data

US 2011/0024358 A1    Feb. 3, 2011

(51) Int. Cl.
  *B01D 9/00*    (2006.01)
  *B01D 21/01*   (2006.01)

(52) U.S. Cl.
  CPC .............. *B01D 9/0018* (2013.01); *B01D 21/01* (2013.01)
  USPC ............................ 210/670; 210/710; 210/727

(58) Field of Classification Search
  CPC .............................. B01D 9/0018; B01D 21/01
  USPC ........................................................ 210/670
  See application file for complete search history.

(56) References Cited

U.S. PATENT DOCUMENTS

| 3,983,220 | A * | 9/1976 | Pollock ........................... | 423/283 |
| 7,955,853 | B2 * | 6/2011 | Hicks et al. ........................ | 436/6 |
| 2005/0279500 | A1 * | 12/2005 | Heins ............................. | 166/266 |
| 2007/0114178 | A1 * | 5/2007 | Coppola et al. ............... | 210/660 |

FOREIGN PATENT DOCUMENTS

JP    2005-279346    10/2005

* cited by examiner

*Primary Examiner* — Tony G Soohoo
*Assistant Examiner* — Peter Keyworth
(74) *Attorney, Agent, or Firm* — Landmark Intellectual Property Law, PC

(57) ABSTRACT

A process removes boron from ion exchange system regeneration solution including introducing a borate precipitator into the regeneration solution in a precipitation zone to generate borate precipitate; introducing a coagulator into the regeneration solution that coagulates solids and/or borate precipitate generated by the borate precipitator and absorbs boron into the solids; introducing the regeneration solution, solids and borate precipitate into a separation zone; introducing anionic polymer into the regeneration solution adjacent to or in the separation zone to increase the propensity of borate precipitate and solids to separate from the regeneration solution; and filtering the regeneration solution to remove residual suspended solids from the regeneration solution. Another process removes boron from ion exchange system regeneration solution including introducing a caustic material into the regeneration solution; heating the regeneration solution to a selected temperature; introducing heated regeneration solution into an evaporation zone to remove at least a substantial portion of water from the regeneration solution and thereby form a slurry comprising boron salt(s); and introducing the slurry into a crystallizer zone to remove residual water.

4 Claims, 3 Drawing Sheets

APPARATUS AND PROCESSES FOR REMOVING BORON FROM LIQUIDS

TECHNICAL FIELD

This disclosure relates to apparatus and processes for removing boron from liquids, particularly to apparatus and processes for removing boron from ion exchange system regeneration liquids, more particularly regeneration solutions generated from ion exchange resin regeneration processes of a flue gas desulfurization wastewater treatment process.

BACKGROUND

Burning coal produces solid wastes such as bottom and fly ash, as well as flue gases containing $SO_x$ compounds. The flue gases containing $SO_x$ compounds are subjected to flue gas desulfurization (FGD) treatment processes in dedicated FGD treatment systems.

The POD treatment systems often are so-called "wet scrubbing" systems that remove 90% or more of the $SO_x$ compounds, but generate wastewater that contains a variety of different contaminants. Thus, that wastewater requires treatment before release into the environment. A variety of treatment methodologies are employed to remove the various types of contaminants. One of those contaminants is boron which is frequently removed by selective ion exchange during one part of the treatment process. Such selective ion exchange systems/processes often times remove the boron down to a concentration of less than about 5 mg/l (measured as B).

The selective ion exchange system utilizes well known resins, often in bead form, to strip the boron from the FGD wastewater stream. However, such ion exchange systems require periodic regeneration to restore the resin to its initial stripping capability and efficiency. Often times, a 4-6% sulfuric acid or hydrochloric acid solution is introduced into the resin to strip the boron from the resin.

This acid regeneration step creates another type of waste liquid, namely an acid regeneration liquid or solution. Thus, there is a need to treat such ion exchange system regeneration liquids.

SUMMARY

We thus provide a process for removing boron from ion exchange system regeneration solution comprising introducing a borate precipitator into the regeneration solution in a precipitation zone to generate borate precipitate; introducing a coagulator into the regeneration solution that coagulates solids and/or borate precipitate generated by the borate precipitator and absorbs boron into the solids; introducing the regeneration solution, solids and borate precipitate into a separation zone; introducing anionic polymer into the regeneration solution adjacent to or in the separation zone to increase the propensity of borate precipitate and solids to separate from the regeneration solution; and filtering the regeneration solution to remove residual suspended solids from the regeneration solution.

We also provide a process for removing boron from ion exchange system regeneration solution comprising introducing a caustic material into the regeneration solution; heating the regeneration solution to a selected temperature; introducing heated regeneration solution into an evaporation zone to remove at least a substantial portion of water from the regeneration solution and thereby form a slurry comprising boron salt(s); and introducing the slurry into a crystallizer zone to remove residual water.

We further provide an apparatus for removing boron from ion exchange system regeneration solution comprising a regeneration solution supply; a precipitation zone having an inlet connected to the regeneration solution supply and an outlet; a borate precipitator supply connected to the precipitation zone which introduces borate precipitator into the regeneration solution to generate borate precipitate; a coagulator supply connected to the precipitation zone which introduces coagulant into the regeneration solution that coagulates solids and borate precipitate generated by the borate precipitator; a separation zone connected downstream of the precipitation zone; an anionic polymer supply connected downstream of the precipitation zone which introduces anionic polymer into the regeneration solution and increases the propensity of borate precipitate and solids to separate from the regeneration solution; and a filter connected downstream of the separation zone that removes residual suspended solids from the regeneration solution.

We still further provide an apparatus for removing boron from ion exchange system regeneration solution comprising a regeneration solution supply; a caustic supply that introduces caustic into the regeneration solution; a heat source associated with the regeneration solution supply that heats the regeneration solution; an evaporation zone connected to receive heated regeneration solution that removes water from the regeneration solution and forms a slurry comprising boron salt(s); and a crystallizer zone connected to receive the slurry which removes residual water from the slurry.

DETAILED DESCRIPTION

Figure 1:
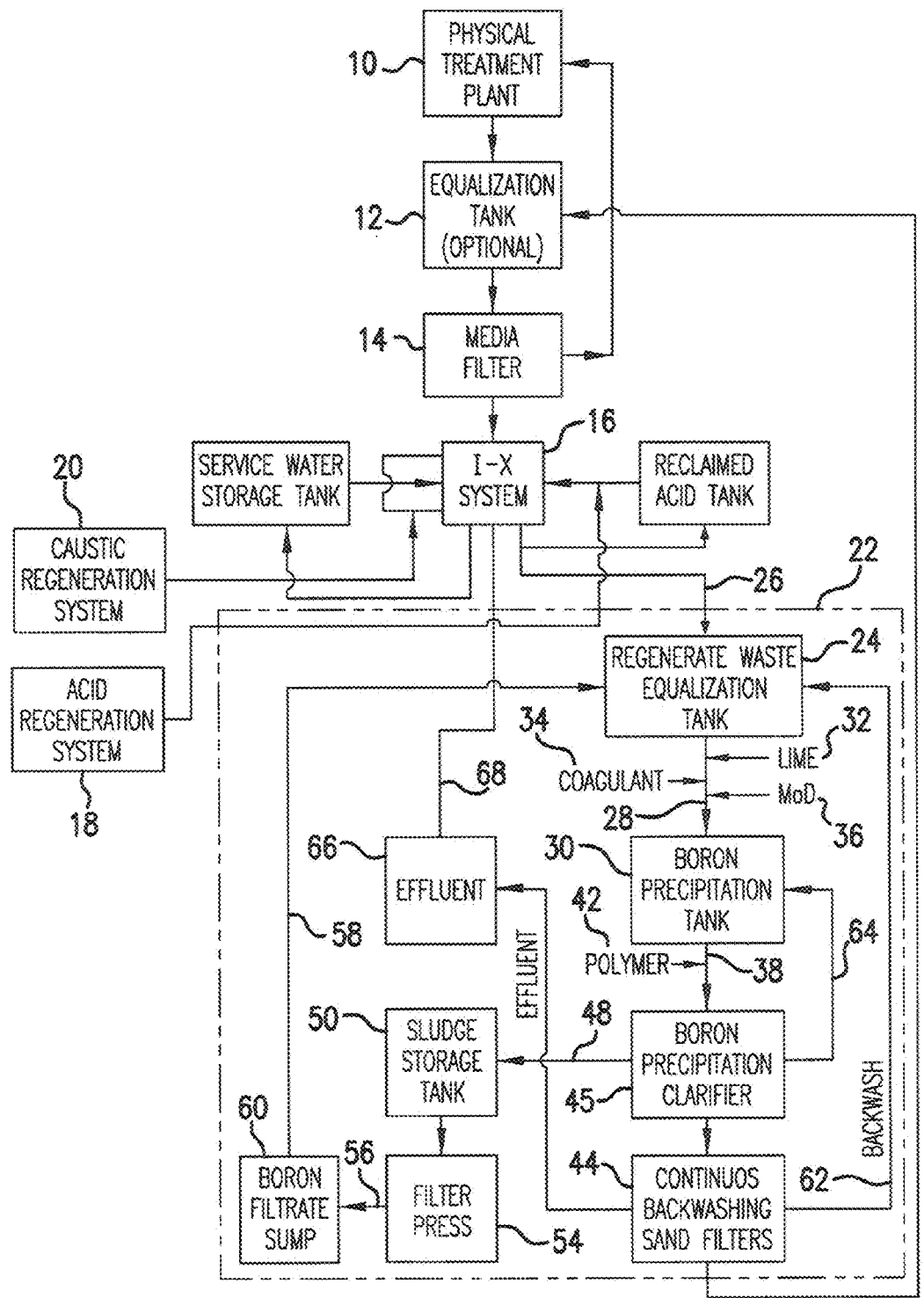
FIG. 1 is a schematic flow diagram of one example of a treatment system.

It will be appreciated that the following description is intended to refer to specific examples of structure selected for illustration in the drawings and is not intended to define or limit the disclosure, other than, in the appended claims.

Turning now to FIG. 1 and one representative example of a system that may be used to remove boron from liquids generally and ion exchange system regeneration solution, in particular, the system shown in FIG. 1 is typically downstream of a FGD treatment system that produces FGD system wastewater. That wastewater is introduced into a physical treatment plant 10. One of the treatment aspects of physical treatment plant 10 is to conduct a selective ion exchange to remove boron from the FGD wastewater. As part of the treatment aspects, the FGD wastewater can be sent to an optional equalization tank 12, followed by pressure filters 14 to remove selected solid materials. Then, the FGD wastewater flows to an ion exchange system 16 which contains ion exchange resin to remove the boron.

The ion exchange system requires periodic regeneration which is achieved by contacting the ion exchange resin with sulfuric acid or hydrochloric acid, typically in a solution of about 4% to about 6%, to strip boron from the ion exchange resin. Thus, an acid regeneration system or supply 18 connects to the ion exchange system 16. Also, a caustic regeneration system 20 connects to the ion exchange system to neutralize the system from the acid regeneration portion of the process.

The acid regeneration process removes boron from the ion exchange resin. However, that process creates ion exchange system regeneration solution which contains the boron removed from the FGD wastewater. Thus, this ion exchange system regeneration solution requires treatment before discharging the liquid into the environment. This is achieved by a boron precipitation system 22. Boron precipitation system 22 comprises a number of components described below.

One component is a regeneration solution storage supply 24 connected to ion exchange system 16 by line 26. Regeneration solution storage supply 24 is typically a type of holding tank which supplies ion exchange system regeneration solution for downstream treatment.

A line 28 connects the regeneration solution supply 24 to a boron precipitation reactor 30. However, there are several supplies connected to line 28 in FIG. 1 which supply a borate precipitator and at least one coagulant. These are introduced into line 28 by lines 32, 34 and 36, which supply lime, coagulant and MgO, respectively, in this case. It is also possible that the supplies 32, 34 and 36 can be introduced at other locations such as directly into boron precipitation reactor 30. These materials are typically used without the need to add silicate compounds. Thus, the process is free of such silicates.

The borate precipitator (supplied from line 32) may be hydrated lime slurry to induce precipitation of calcium borate. However, other calcium supplying compounds can be used. Also, at least one coagulant may be added such as ferric chloride solution and/or aluminum sulfate solution and/or magnesium oxide solution or the like. Other coagulants known in the art may also be used. These materials coagulate the solids/precipitates being generated by the precipitation reaction and absorb boron and/or boron precipitate into the generated solids.

The dosage of hydrated lime slurry added into the regeneration solution is typically about 15,000 ppm-about 25,000 ppm lime per liter of regeneration solution. Similarly, about 100 to about 3,000 ppm of coagulant per liter of regeneration solution may be added into the regeneration solution flow. The temperature of the materials and the regeneration solution may be in the range of about 32° F. to about 125° F. The solids produced by addition of the borate precipitator and coagulant typically include, but are not limited to, calcium borate, calcium sulfate, calcium chloride, ferric hydroxide, magnesium hydroxide, aluminum hydroxide plus water and other rations and anions.

Line 38 connects to an outlet of the boron precipitation reactor 30 and connects to the inlet of a boron precipitation clarifier 40. FIG. 1 shows a polymer supply line 42 connected between boron precipitation reactor 30 and clarifier 40. While line 42 directly connects to line 38, it is also possible for line 42 to supply polymer to other locations such as directly at the entryway of the clarifier 40, for example.

The anionic polymer is typically a polyacrylamide such as anionic polymer manufactured by Nalco. These polymers may be introduced at a dosage of about 2 to about 25 ppm per liter of regeneration solution. The polymer increases the propensity of the solids generated in boron precipitation reactor 30 to settle out of the liquids in clarifier 40.

While the solids settle to the bottom of clarifier 40, the regeneration solution, which is mostly water, may be collected and conveyed by gravity to filter 44 by line 46. The settled solids thicken at the bottom of clarifier 40 and ultimately become a type of sludge. The sludge is then removed from clarifier 40 by line 48 to a sludge storage tank 50. The sludge is then moved by line 52 to a filter press 54 so that the sludge may be dewatered.

There are several recycling possibilities that can be introduced into the process. One recycle possibility is that at least a portion of the sludge from filter press 54 can be recycled back to the regeneration solution storage supply 24 by lines 56 and 58 as assisted by boron filtrate sump 60.

It is also possible for backwash generated from filter 44 to be recycled to boron solution storage supply 24 by line 62. Such backwash is typically produced in a sand filter which is the preferred type of filter for filter 44. The sand can be any type of sand or other filter material known in the art.

It is further possible for a portion of the calcium borate solids isolated in clarifier 40 to be recycled back to the boron precipitation reactor 30 by way of line 64.

It is still further possible for influent from filter 44 to be recycled back to ion exchange system 16 by line 64, influent storage tank 66 and line 68. It is still further possible to employ recycle line 68 to recycle materials back to the optional equalization tank 12.

Figure 2:
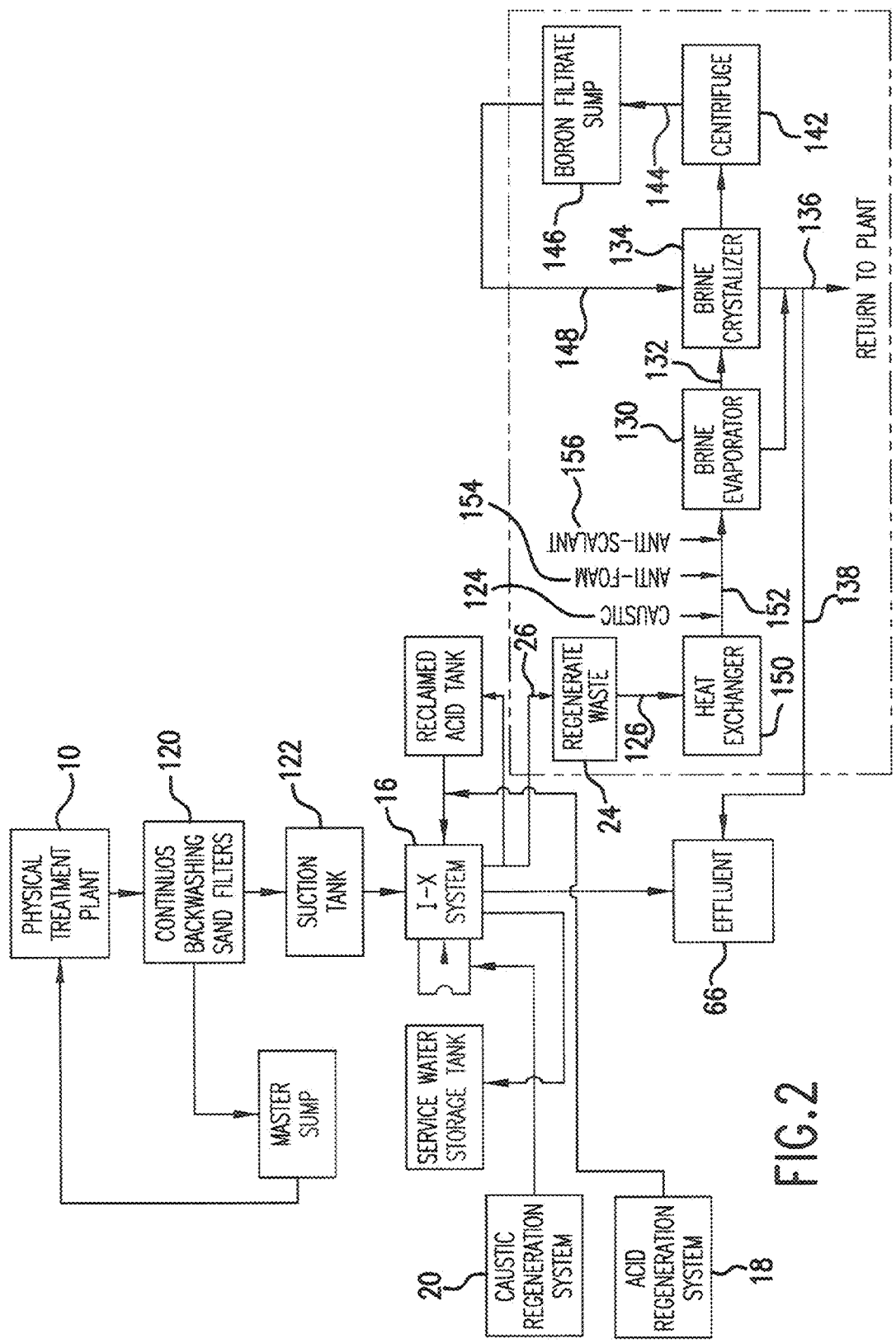
FIG. 2 is a schematic diagram of another example of a treatment system.

Turning now to FIG. 2, another representative example of a system for removing boron from ion exchange system regeneration solution is shown. This system connects to the same or similar physical treatment plant 10 as shown in FIG. 1. This treatment plant receives FGD wastewater from an FGD treatment system. Thus, the "upstream" portion of the system can be the same as that shown in FIG. 1 or it can be different in some respects as shown in FIG. 2.

In that regard, FIG. 2 shows sand filter 120 connected to physical treatment plant 10. A suction tank 122 is located downstream of filter 120. Suction tank 122 connects to an ion exchange system 16 (similar to or the same as ion exchange system 16 of FIG. 1). Ion exchange system 16 removes boron from the filtered FGD wastewater. That ion exchange system 16, as in FIG. 1, is regenerated on a periodic basis and uses an acid regeneration system 18 similar to that as FIG. 1. The acid regeneration system 18 can employ a variety of acids such as sulfuric acid or hydrochloric acid. Then, line 26 conveys ion exchange system regeneration solution to regeneration solution storage supply 24 which, as in FIG. 1, can act as a type of holding tank. The regeneration solution subsequently passes to heat exchanger 150 by line 126. Heat exchanger 150 supplies heat to the regeneration solution. That supplied heat raises the temperature the regeneration solution from about 75 to about 100° F. to about 150 to about 200° F. Thus, the regeneration solution is pumped through heat exchanger 150 to increase the temperature of the regeneration solution to aide in the evaporation process. Condensate from the evaporation process may be used as source water for heating the incoming regeneration solution to increase efficiencies.

Caustic supply 124 adds caustic material to the regeneration solution at line 152 after the regeneration solution passes through heat exchanger 150. This caustic material is typically sodium hydroxide and is used to prevent scaling in downsteam apparatus. A anti-foam supply 154 and an anti-scalant supply 156 connect to line 152.

Line 152 connects to brine evaporator 130. Preferably, brine evaporator 130 is a so-called "fallen film" evaporator where water is removed by evaporation. Other types of evaporators may be employed. The regeneration solution is recirculated within the evaporator and produces a slurry. This occurs as salts in the water begin to crystallize.

Also, it is possible to employ condensate produced by evaporator 130 to preheat the incoming regeneration solution to aide the process. Then, the crude condensate may be recovered and either sent back to the treatment plant for reuse or discharged into the environment.

Typically, evaporator 130 removes about 70 to about 80% of the water from the regeneration solution. Also, the evaporator maintains the temperature of the regeneration solution in the range of about 150 to about 200° F.

The slurry produced in evaporator 130 then travels by line 132 to brine crystallizer 134. Crystallizer 134 evaporates most of the remaining water in the regeneration solution to the point where about 80 to about 95% of the water originally contained in the regeneration solution has been removed. This leaves solid boron compounds such as crystal borates, for example. The condensate produced by crystallizer 134 is recovered and later can be sent hack to the treatment plant 10 for reuse or discharged to the environment. This is shown in lines 136 and 138.

The solids generated in crystallizer 134 are then moved via line 140 to a centrifuge or decanter 142 which produces a dewatered cake which is then removed for final disposal. The centrate from centrifuge 142 may be sent back to any number of the earlier components such as the crystallizer 134 by line 144, sump 146 and line 148, for example.

Figure 3:
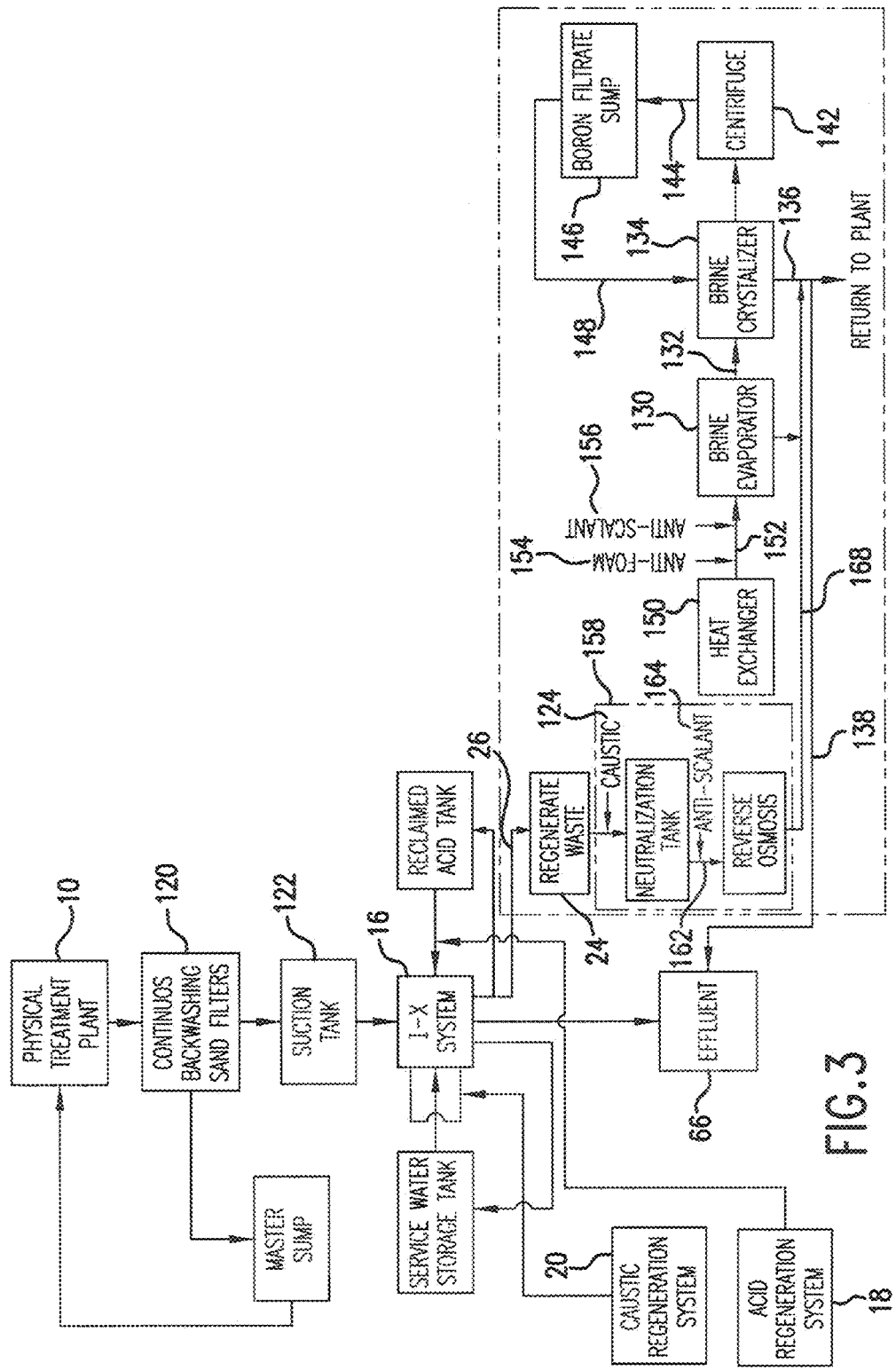
FIG. 3 is a schematic diagram of yet another example of a treatment system which is a variant of the system shown in FIG. 2.

Turning now to FIG. 3, the system is a variation of the system shown in FIG. 2 which contains optional components as shown by the dashed lines 158. The remaining portions of the system are the same as in FIG. 2 and are not discussed further. It can be seen in FIG. 3 that a neutralization tank 160 is positioned downstream of regeneration waste tank 24 and downstream of caustic supply 124. Neutralization tank 160 allows for regeneration solution to be neutralized by virtue of the addition of the caustic material from supply 124. Then, the neutralized regeneration solution is removed via line 162 so that it can be subjected to a reverse osmosis treatment process by reverse osmosis membrane(s) 164. Any number of types of reverse osmosis membranes available from Dow Chemical, T-Hydranautics and Toray Industries, for example, may be used. Also, an anti-scalant supply 166 adds anti-scalant at line 162. Line 168 allows at least a portion of the regeneration solution passed through reverse osmosis membrane(s) 164 can be recycled back to plant 10 by line 168 for reuse or discharged to the environment through line 138.

This disclosure contains three (3) representative examples of systems and describes three (3) representative examples of processes that may be used to remove boron from ion exchange system regeneration liquids/solutions. Other examples and other structures and other steps and additional processes may be added and are fully contemplated in this disclosure.

The apparatus and systems disclosed herein provide for efficient and effective processes for removing boron from ion exchange system regeneration liquids/solutions that are generated from ion exchange resin regeneration processes that are included in typical flue as desulfurization wastewater treatment processes. Of course, these systems and processes are applicable to other contaminants that may be found in FGD wastewater or even other types of wastewater which contain contaminants of a similar type to those in POD wastewater. Thus, various other metals and metal compounds may be removed by the Applicants' apparatus and processes.

A variety of modifications to the apparatus and processes described will be apparent to those skilled in the art from the disclosure provided herein. Thus, the apparatus and processes may be embodied in other specific forms without departing from the spirit or essential attributes thereof and, accordingly, reference should be made to the appended claims, rather than to the foregoing specification, as indicating the scope of this disclosure.

The invention claimed is:

1. A process for removing boron from ion exchange system regeneration solution, wherein the regeneration solution comprises sulfuric or hydrochloric acid that has stripped boron from an ion exchange resin, the process comprising . . .

a.) introducing a caustic material into the regeneration solution;
 b.) heating the regeneration solution selected temperature of about 150-200.degree. F. in a heat exchanger;
 c.) introducing heated regeneration solution into an evaporation zone to remove about 70% to about 80% of water from the regeneration solution and thereby form a slurry comprising boron salt(s); and
 d.) introducing the slurry into a crystallizer zone to remove residual water such that about 80% to about 95% of the water in the regeneration solution is removed.

2. The process of claim 1, wherein a by-product of the evaporation zone is heated condensate and wherein the process further comprises heating influent regeneration solution for the heat exchanger with heated condensate from the evaporation zone.

3. The process of claim 1, further comprising recycling regeneration solution within the evaporation zone.

4. The process of claim 1, wherein the caustic material is sodium hydroxide.

* * * * *